United States Patent [19]

Cornett

[11] Patent Number: 4,554,509
[45] Date of Patent: Nov. 19, 1985

[54] FREQUENCY SHIFT KEYED DEMODULATION SYSTEM

[75] Inventor: Frank N. Cornett, State College, Pa.
[73] Assignee: HRB-Singer, Inc., State College, Pa.
[21] Appl. No.: 644,296
[22] Filed: Aug. 27, 1984
[51] Int. Cl.[4] ............................................. H04L 27/14
[52] U.S. Cl. .................................. 329/105; 329/110; 375/80; 375/88; 375/89
[58] Field of Search ............... 329/105, 110, 112, 122, 329/126; 375/45, 47, 48, 80, 88, 89, 90, 94

[56] References Cited

U.S. PATENT DOCUMENTS

| | | | |
|---|---|---|---|
| 4,027,266 | 5/1977 | Clark | 329/105 |
| 4,096,442 | 6/1978 | McRae et al. | 329/112 |
| 4,291,275 | 9/1981 | Nossen | 329/112 |
| 4,335,354 | 6/1982 | Crandall et al. | 329/126 |

Primary Examiner—Siegfried H. Grimm
Attorney, Agent, or Firm—David L. Davis; Robert E. Smith; Edward L. Bell

[57] ABSTRACT

A demodulator for continuous phase frequency shift keyed signals is implemented through the medium of computer software and processes incoming signals which are initially passed through an interference reduction filter. The disclosed demodulation algorithm makes use of the fact that the phase is continuous between adjacent symbols, as well as other symbol to symbol correlations, to reduce the error rate by processing a string of symbols utilizing a two step symbol decision process, instead of merely demodulating a symbol from a time slice of the received signal. The two step symbol decision process consists of a forward and reverse pass, wherein a candidate symbol predecessor is recursively chosen for each symbol, according to a maximum likelihood decision criterion, on the forward pass. Once a singular candidate predecessor is encountered, a reverse pass is initiated, so that a unique sequence of symbols is chosen back to a previously encountered singular predecessor.

2 Claims, 6 Drawing Figures

FREQUENCY SHIFT KEYED DEMODULATION SYSTEM

BACKGROUND OF THE INVENTION

This invention relates to a frequency shift keyed demodulation system and, more particularly, to a system for demodulating continuous phase frequency shift keyed signals by recursively estimating the symbol values in a sequence.

Upon reception, a continuous phase frequency shift keyed signal is typically corrupted by white Gaussian noise and non-white interference. Discrete time samples of the sum of the signal of interest, noise and interference are produced by band limiting the received wave form, sampling at a rate satisfying the Nyquist criterion, complex heterodyning and filtering to pass positive frequency components and eliminate negative frequency components. In its simplest form, a demodulator can examine the received signal and choose as its output symbol that symbol which most closely corresponds with the received signal, independent of the value of any other previously received symbol. At the other extreme, a demodulator can examine every possible combination of symbols in a sequence and determine which combination most closely corresponds to the received multisymbol signal. The first of these demodulation techniques is relatively simple to implement but suffers from a relatively high symbol error rate. The other of the techniques has a low symbol error rate but is impractical to implement. It is therefore an object of the present invention to provide a demodulator for frequency shift keyed signals which results in a low symbol error rate and is practical to implement.

The most commonly utilized type of frequency shift keying is continuous phase frequency shift keying. The fact that the phase is continuous between adjacent symbols provides useful information. It is therefore another object of this invention to provide a demodulator which utilizes this continuous phase information.

SUMMARY OF THE INVENTION

The foregoing and additional objects are attained in accordance with the principles of this invention by providing a demodulator for a sequence of continuous phase frequency shift keyed symbols which utilizes a two pass symbol decision process. This two pass process consists of a forward and reverse pass, wherein a candidate symbol predecessor is recursively chosen for each symbol, according to a maximum likelihood decision criterion, on the forward pass. When a singular candidate predecessor is encountered, a reverse pass is initiated, so that a unique sequence of symbols is chosen back to a previously encountered singular predecessor.

BRIEF DESCRIPTION OF THE DRAWINGS

The foregoing will be more readily apparent upon reading the following description in conjunction with the drawings wherein.

DETAILED DESCRIPTION

Figure 1A:
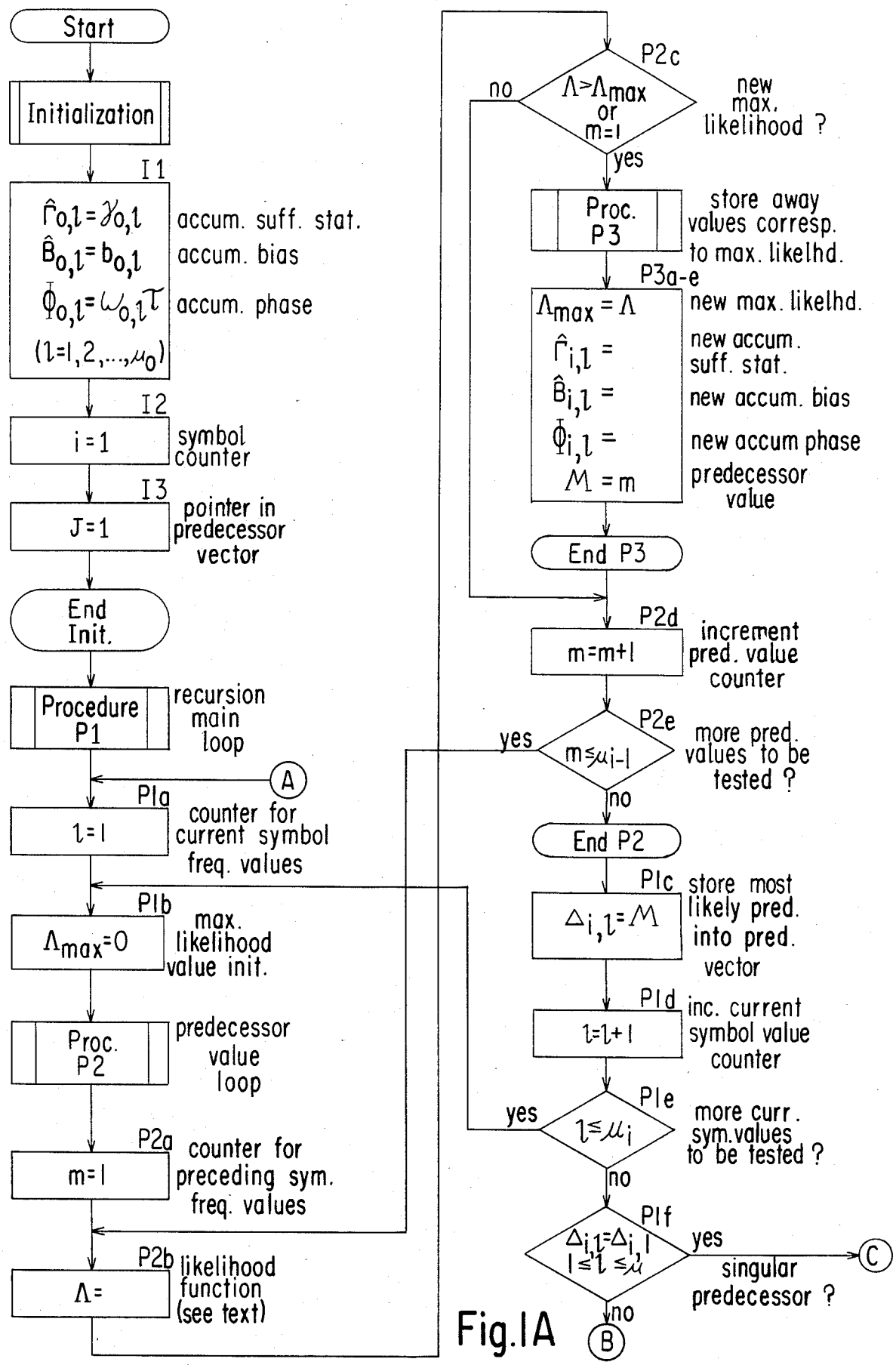
FIG. 1A and 1B together form a flow chart of a software implementation of this invention.

A continuous phase frequency shift keyed signal s(t) can be completely described by specifying the values of its analytic signal during the i th symbol period, as follows:

$$s_i(t) = p(t - i\tau) \exp(j(\omega_i(t - i\tau) + \phi_i + \theta)) \quad (1)$$

where
- t = time of observation, $t \geq 0$
- i = symbol number, $i \geq 0$
- $\tau$ = symbol duration
- $j = \sqrt{-1}$
- $\omega_i$ = radian frequency of i th symbol
- $\phi_i$ = phase accumulated up to $t = i\tau$ due to modulation, with $\phi_i = 0$
- $\theta$ = initial phase at $t = 0$
- p(t) = amplitude modulation function, nonzero only for $0 \leq t < \tau$ Upon reception, s(t) is typically corrupted by white Gaussian noise and non-white interference. Discrete time samples of the analytic signal of the sum of the signal of interest (SOI), noise, and interference are produced by bandlimiting the received waveform, sampling at a rate satisfying the Nyquist criterion, complex heterodyning, and filtering to pass positive frequency components and eliminate negative frequency components. Following these operations, the resultant samples are given by:

$$r(kT) = s_i(kT) + n(kT) + u(kT); \quad k \geq 0 \quad (2)$$

where
- n(kT) = samples of analytic noise signal
- u(kT) = samples of analytic interference signal
- T = sampling interval The maximum a posteriori (MAP) estimate of the i th symbol value is that value of $\omega_i$ which maximizes the probability density of $\omega_i$ conditioned upon a set of received samples. From Bayes' rule, that conditioned density is given by:

$$p(\omega_i | r) = p(r | \omega_i) p(\omega_i) / p(r) \quad (3)$$

where
- r is a N-vector comprising N samples of r(kT)
- $p(r | \omega_i)$ is the conditional density of r, given that the i th symbol value = $\omega_i$
- $p(\omega_i)$ is the probability that the i th symbol value = $\omega_i$
- p(r) is the probability density of r From equation (1) and the definition of $\phi_i$, which can be expressed as:

$$\phi_i = \sum_{l=1}^{i-1} \omega_l \tau \quad (4)$$

it is apparent that r is affected not only by $\omega_i$, but also by $\omega_l$, for all $l < i$. In fact, if samples of the i th symbol are located within r, when r is also affected by $\omega_l$, for $l > i$. Thus, one is led to a more powerful generalization of equation (3), wherein r is conditioned on a set $\Omega$ of symbol frequencies, and vice-versa:

$$p(\Omega | r) = p(r | \Omega) p(\Omega) / p(r) \quad (5)$$

The MAP estimate of $\Omega$ is that sequence of symbol frequencies which maximizes this expression. In general, however, such maximization requires exhaustive evaluation, which is impossible in the exact sense, since usually there is no means for truncating the length of r and limiting the size of $\Omega$ without compromising the theory. Even approximations wherein r and $\Omega$ are limited to relatively small sizes can result in prohibitive computation. For example, if the SOI modulation were quaternary, then to evaluate equation (5) for a sequence of only 50 symbols would require $4^{50} \simeq 10^{30}$ evaluations, which cannot be done in reasonable time with current technology.

This problem has been addressed, for example, in U.S. Pat. No. 4,096,442, to McRae et al. According to that patent, symbol estimates are based upon sequential groupings of three symbols. The present invention improves upon this particular aspect of the scheme of McRae et al, by performing recursive estimation of symbol sequences over sequence lengths with no inherent or practical limitations.

Continuing with equation (5), one can see that p(r) is independent of $\Omega$, so that maximizing $p(\Omega|r)$ is equivalent to maximizing the likelihood function $$\lambda_\Omega(r) = p(r|\Omega)p(\Omega) \tag{6}$$

The vector r is now modeled as a complex Gaussian N-vector with means $s_\Omega$, which is an N-vector made up of samples $s_i(kT)$, $i \geq 0$, $k \geq 0$, $\Omega_i \epsilon \Omega$, given by equation (1). Equation (6) can be expanded as $$\lambda_\Omega(r|\theta) = C_1 \exp[-\tfrac{1}{2}(r-s_\Omega)^T K^{-1}(r-S_\Omega)^*]p(\Omega) \tag{7}$$

where $C_1$ is an inconsequential constant, the superscript T denotes matrix transposition, and the superscript * denotes complex conjugation. The N by N matrix K is the covariance matrix of noise plus interference. Note that it is conditioned upon knowledge of the initial phase $\lambda_\Omega$. Expansion of equation (7) results in $$\lambda_\Omega(r|\theta) = C_1 \exp[-\tfrac{1}{2}(r^T K^{-1} r^* - 2R_e r^T K^{-1} S^*_\Omega + S^T_\Omega K^{-1} S^*_\Omega)]p(\Omega) \tag{8}$$

Since $r^T K^{-1} r^*$ is dependent only upon r, and thus is independent of $\Omega$, $C_1 \exp(-\tfrac{1}{2} r^T K^{-1} r^*)$ can be replaced by $C_2$, a second inconsequential constant. Also, since $\theta$ is in general unknown, it is modeled as being uniformly random in $[0, 2\pi]$, and the dependence upon $\theta$ is removed by noting that $$\lambda_\Omega(r) = [\int_0^{2\pi} \lambda_\Omega(r|\theta) p(\theta) d\theta] p(\Omega) = [C_2 I_0(|r^T K^{-1} s^*_\Omega|) \exp(-\tfrac{1}{2} S_\Omega^T K^{-1} S^*_\Omega)] p(\Omega) \tag{9}$$

This expression can now be simplified by noting that maximizing $\lambda_\Omega(r)$ is equivalent to maximizing its logarithm, and by discarding the constant $\ln C_2$, to obtain the log-likelihood function $$\Lambda_\Omega(r) = [\ln I_0(|r^T K^{-1} s^*_\Omega|) - \tfrac{1}{2} s^T_\Omega K^{-1} s^*_\Omega] + \ln(p(\Omega)) \tag{10}$$

Here, and in equation (9), $I_0$ is the zeroth order Bessel function of imaginary argument.

The various operations in equation (10) can be interpreted in the following ways:

$r^T K^{-1}$ is a vector made up of input SOI plus noise plus interference samples $r^T$, filtered by the inverse covariance $K^{-1}$ to remove non-white interference.

$|r^T K^{-1} s^*|$ is the correlation between the filtered signal $r^T K^{-1}$ and the SOI replica $s_\Omega$.

$\tfrac{1}{2} s_\Omega^T K^{-1} s_\Omega^*$ is a so-called bias term which compensates for the effects of the filter $K^{-1}$ upon the SOI component of $r^T$.

The MAP symbol sequence is determined by the set $\Omega$ which maximizes $\Lambda_\Omega(r)$.

As was stated previously, an exact implementation of equation (10) is in general impossible, the dimensions of r, K, s, and $\Omega$ being prohibitively large or even unbounded. The present invention relies upon a recursive scheme to approximate an implementation of equation (10).

Derivation of the recursive approximation is begun by rewriting the second term in equation (10) as follows:

$$\tfrac{1}{2} s_\Omega^T K^{-1} s_\Omega^* \simeq \tag{11}$$

$$\tfrac{1}{2} S_\Omega^T P^{-1} S_\Omega^* \simeq$$

$$\tfrac{1}{2} \sum_{i=0}^{I-1} \left( \sum_{n=0}^{N-1} P^{-1}(n) |S_i(n)|^2 \right)$$

where $S_\Omega$ is an N-vector comprising samples of the spectrum of $s_\Omega$ $P^{-1}$ is the frequency-domain equivalent of $K^{-1}$.

$P^{-1}$ is an NxN diagonal matrix.

$P^{-1}(n)$ is the n th diagonal element of $P^{-1}$ $S_i(n)$ is the n th sample of the spectrum of $s_i$ In its current embodiment, the invention utilizes this frequency-domain implementation to compute the demodulator bias terms.

The first term in equation (10) is now simplified by noting that $s_\Omega$ can be written as a sum over i of $s_i(kt)$ as defined in equation (1):

$$s_\Omega = \sum_{i=0}^{I-1} \{s_i(kT)\}_{k=L_{i-1}+1}^{L_i}; \; \omega_i \epsilon \Omega \tag{12}$$

Here, the notation $$\{s_i(kT)\}_{k=L_{i-1}+1}^{L_i}$$

denotes an N-vector consisting of samples of the SOI taken from and aligned with the i th symbol, and zeros elsewhere. The time index k begins at $k = L_{i-1}+1$ and ends at $k = L_i$, so that the nonzero portion of the vector has length $L_i - L_{i-1}$. In general, this length is variable unless sampling is synchronous with the SOI symbols. The parameter I in equation (12) is the number of symbols contained in $s/T\Omega$.

Let v denote the N-vector $r^T K^{-1}$. This vector is assumed to be computed externally to the FSK demodulator, and provided as the demodulator's primary input signal. Let $v_k$ denote the k th element of v. With this definition and that of equation (12), the term $r^T K^{-1} s^*_\Omega$ of equation (10) can be written $$r^T K^{-1} s_\Omega^* = v^T s_\Omega^* = \sum_{i=0}^{I-1} v^T \{s_i^*(kT)\}_{k=L_{i-1}+1}^{L_i} = \tag{13}$$

-continued $$\sum_{i=0}^{I-1} \sum_{k=L_{i-1}+1}^{L_i} v_K s_i^*(kT) =$$

$$\sum_{i=0}^{I-1} \sum_{k=L_{i-1}+1}^{L_i} v_k p(kT - i\tau)\exp(-j[(\omega_i(kT - i\tau) + \phi_i + \theta)] \quad 5$$

The last equality follows from an explicit expression of s (kT) as given in equation (1). A slight rearrangement results in $$\underline{v}^T \underline{s} \Omega^* = \qquad (14)$$

$$\sum_{i=0}^{I-1} \exp[-j(\phi_i + \theta)] \sum_{k=L_{i-1}+1}^{L_i} V_k p(kT - i\tau)\exp[-j\omega_i(kT - i\tau)]$$

Values of the second summation can be computed for each i and candidate $\omega_i$, independently of $\phi_i$ and $\theta$, and then combined as indicated by the summation over i. These values must be computed for each possible value of $\omega_i$ so as to maximize the likelihood function. Let the possible values of $\omega_i$ be denoted as $\omega_{i,1}, \omega_{i,2}, \ldots, \omega_{i,\mu_i}$ so that at the i th symbol, there are $\mu_i$ possible frequencies. Clearly, $\mu_i \geq 1$. However, there is no fundamental upper limit on $\mu_i$. In fact, the modulation frequency can take on a continuum of values between a lower and upper limit; in this case, $\mu_i$ must simply be chosen with a sufficiently large value to provide acceptably fine quantization of the estimate of $\omega_i$.

Let $$\gamma_{i,l} = \sum_{k=L_{i-1}+1}^{L_i} V_k p(kT - i\tau)\exp[-j\omega_{i,l} \cdot (kT - i\tau)] \quad (15)$$

The values of $\gamma_{i,l}$ are the so-called sufficient statistics of v. From equations (15), (14), (13), (11), and (10), the likelihood function can now be written as $$\Lambda_{I,l}(\underline{\gamma}) = 1_n I_o \left( \left| \sum_{i=0}^{I-1} \exp[-j(\phi_i + \theta)]\gamma_{i,l} \right| \right) - \frac{1}{2} \sum_{i=0}^{I-1} b_{i,l} \quad (16)$$

where $b_{i,l}$ denotes the bias component corresponding to $\omega_{i,l}$, computed as indicated in equation (11):

$$b_{i,l} = \sum_{n=0}^{N-1} P^{-1}(n)|S_i(n)|^2; \; \omega_i = \omega_{i,l} \quad (17)$$

In equation (16), the dependence of $\Lambda$ upon $\omega_{i,l}$ for $0 \leq i < I$, is denoted explicitly with the subscripts I,l. The second phase term, $\phi_i$, is implicitly dependent upon frequency sequences preceding the i th symbol. Also, note that the argument of $I_o$ in that equation is independent of $\theta$, due to the absolute value, as it should be.

A recursive scheme for approximating the frequency sequence which maximizes $\Lambda$ is now presented. This scheme is developed as follows: Let $\Gamma_{i-1,m}$, m=1, 2, ..., $\mu_{i-1}$, denote a sufficient statistic accumulated up to the (i-1) th symbol, and corresponding to $\omega_{i-1,m}$. That is, $$\Gamma_{i-1,m} = \sum_{k=0}^{i-1} \exp(-j\phi_k)\gamma_{k,l} \quad (18)$$

For k=i−1 in this summation, l=m, but values of l for k<i−1 are as yet unspecified. Similarly, let $B_{i-1,m}$, m=1, 2, ..., $\mu_{i-1}$, denote the corresponding accumulation bias terms, so that $$B_{i-1,m} = \sum_{k=0}^{i-1} b_{k,l} \quad (19)$$

For each k in this summation, the value of l is the same as that taken in equation (18), so that $\Gamma_{i-1,m}$ and $B_{i-1,m}$ correspond to the same sequence of symbol values.

A method is now needed for transitioning from symbol i−1 to symbol i in some "best" manner. The clear choice is to choose the transition so as to maximize the likelihood function of equation (16). Thus, for each l=1, 2, ..., $\mu_i$, $\Gamma_{i,l}$ and $B_{i,l}$ are chosen such that $$\Gamma_{i,l} = \Gamma_{i-1,m} + \exp(-j\Phi_{i-1,m})\, \Gamma_{i,l} \quad (20)$$

and $$B_{i,l} = B_{i-1,m} + b_{i,l} \quad (21)$$

maximize the value of $$\Lambda_{i,l}(r) = \ln I_o(|\Gamma_{i,l}|) - \tfrac{1}{2} B_{i,l} \quad (22)$$

over m. In equation (20), $\phi_{i-1,m}$ is the phase accumulated through symbol i−1 corresponding to the symbol value sequence implicit in the summation expression (equation (18)) for $\Gamma_{i-1,m}$. Thus, $$\Phi_{i-1,m} = \sum_{k=0}^{i-1} \omega_{k,l}\tau \quad (23)$$

with the l's in this sum corresponding to those used in equation (18) for $\Gamma_{i-1,m}$.

This step-by-step maximization procedure results in choosing a most likely predecessor symbol value $\omega_{i-1,m}$ for each possible symbol value $\omega_{i,l}$ of the current symbol. It also serves to prevent the exponential growth of possible symbol value sequences which occurs if all possible values of $\Gamma$, B, and $\phi$ are computed. Initialization of the procedure is achieved by either setting starting values of $\Gamma$, B, and $\phi$ to zero, or to known values if they are available for some symbol.

In the notation below, $\phi_{i,m}$ is the phase accumulated up to but not including the i th symbol, and corresponding to $\omega_{i-1,m}$ $\Gamma_{i,l}$ is the sufficient statistic accumulated, in a phase-continuous manner, up to and including and i th symbol, and corresponding to $\omega_{i,l}$ (and, consequently, to $\gamma_{i,l}$)

$B_{i,l}$ is the bias accumulated up to and including the i th symbol, and corresponding to $\omega_{i,l}$ (and, consequently, to $b_{i,l}$)

$\hat{\Gamma}_{i,l}$ and $\hat{B}_{i,l}$ are the values of $\Gamma_{i,l}$ and $B_{i,l}$ respectively, which maximize $\Lambda_{i,l}$ over all possible values of $\omega_{i-1,m}$ for each l $\Delta_{i,l}$ is a vector of candidate predecessors of $\omega_{i,l}$ $\hat{\omega}_{i,l}$ is the estimated symbol frequency sequence.

This sequence constitutes the demodulator output.

Initialization $\hat{\Gamma}_{o,l} = \gamma_{o,l}$; l=1,2, ..., $\mu_o$
$\hat{B}_{o,l} = b_{o,l}$; l=1,2, ..., $\mu_o$
$\hat{\phi}_{o,m} = \omega_{o,m}\tau$; m=1,2, ..., $\mu_o$
i=1
J=1

Recursion

Procedure P1
  Step P1a: l=1
  Step P1b: $\Lambda$ max=0
  Procedure P2
    Step P2a: m=1
    Step P2b: $\Lambda = \ln\ I_0(|\hat{\Gamma}_{i-1,m} + \exp\ (-j\underline{\hat{\phi}}_{i-1,m})\gamma_{i,l}|) - \frac{1}{2}(\hat{B}_{i-1,m} + b_{i,l})$
    Step P2c: If $\Lambda > \Lambda_{max}$ or m=1 then execute Procedure P3, else go to Step P2d
    Procedure P3
      Step P3a: $\Lambda_{max} = \Lambda$
      Step P3b: $\hat{\Gamma}_{i,l} = \hat{\Gamma}_{i-1,m} + \exp\ (-j\hat{\phi}_{i-1,m})\gamma_{i,l}$
      Step P3c: $\hat{B}_{i,l} = \hat{B}_{i-1,m} + b_{i,l}$
      Step P3d: $\hat{\phi}_{i,l} = \hat{\phi}_{i-1,m} + \omega_{i,l}T$
      Step P3e: M=m
    End Procedure P3
    Step P2d m=m+1
    Step P2e: If $m \leq \mu_{i-1}$ then go to Step P2b
  End Procedure P2
  Step P1c: $\Delta_{i,l} = M$
  Step P1d: l=l+1
  Step P1e: If $1 \leq \mu_i$ then go to Step P1b
  Step P1f: If $\Delta_{i,l} = \Delta_{i,1}$ for $1 \leq l \leq \mu_i$ then execute Procedure P4, else go to Step P1g
  Procedure P4
    Step P4a: l=i
    Step P4b: m=1
    Step p4c: $M = \Delta_{l,m}$
    Step P4d: $\hat{\omega}_{l-1} = \omega_{l-1,m}$
    Step P4e: m=M
    Step P4f: l=l−1
    Step P4g: if $l \geq J$ then go to Step P4c
    Step P4h: J=i+1
  End Procedure P4
  Procedure P5
    Step P5a: $m = \Delta_{i,1}$
    Step P5b; l=1
    Step P5c: $\hat{\phi}_{i,l} = \omega_{i-1}T + \omega_{i,l}T$
    Step P5d: $\hat{\Gamma}_{i,l} = \gamma_{i-1,m} + \exp\ (-j\hat{\phi}_{i,l})\gamma_{i,1}$
    Step P5e: $\hat{B}_{i,l} = b_{i-1,m} + b_{i,l}$
    Step P5f: l=l+1
    Step P5g: If $1 \leq \mu_i$ then go to Step P5c
  End Procedure P5
  Step P1g: i=i+1
  Step P1h: go to Step P1a
End Procedure P1

Figure 1B:
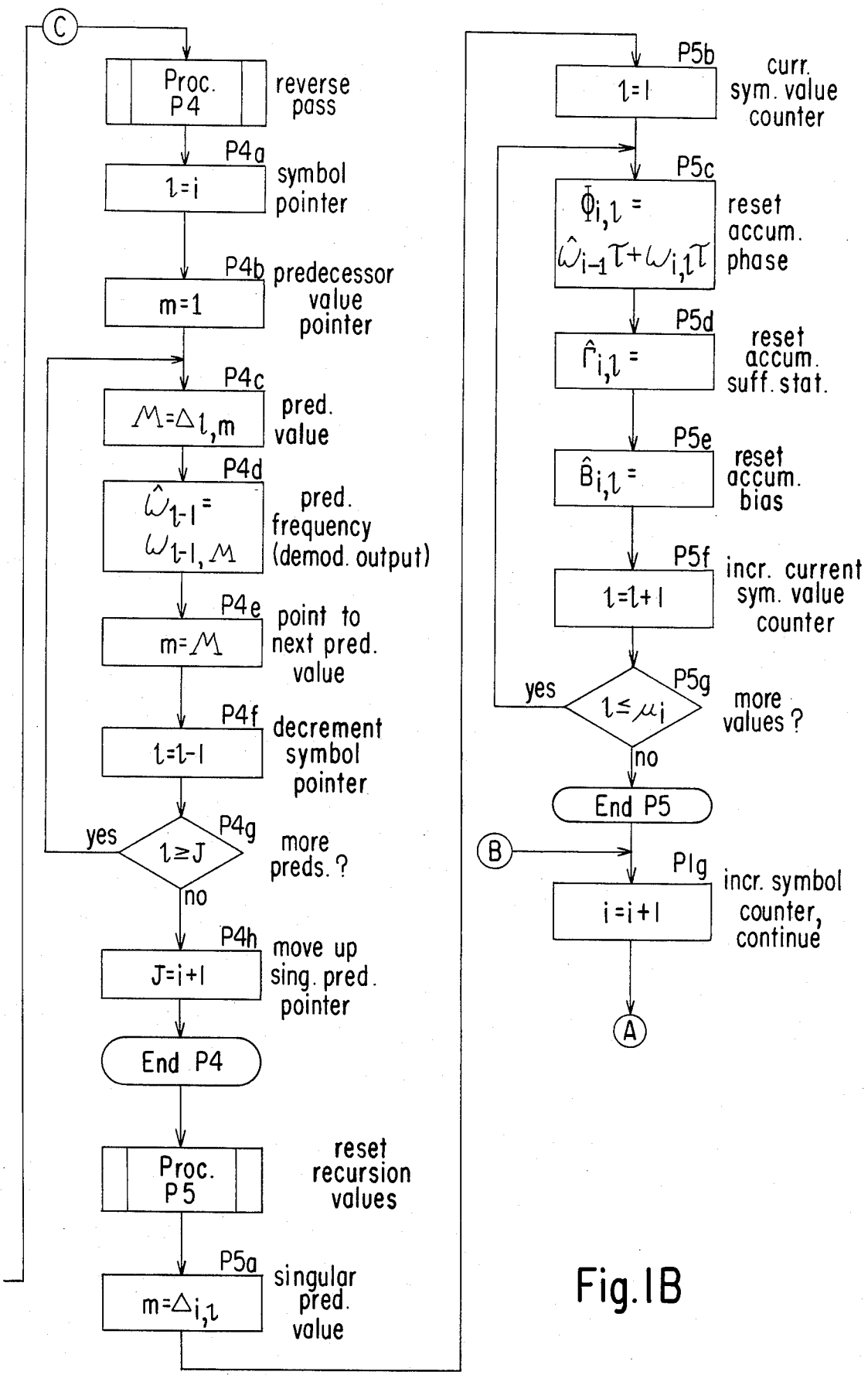

The foregoing is shown as the flowchart of FIGS. 1A and 1B.

Step P1f is a test to determine whether all possible symbol frequencies at the i th symbol share a common predecessor. If that is the case, then Procedure P4 is invoked to select that singular predecessor as $\hat{\omega}_{i-1}$, the singular predecessor of $\hat{\omega}_{i-1}$ as $\hat{\omega}_{i-2}$, etc., back to the previous singular predecessor, the position of which is tagged by J. An alternative embodiment is possible whenever it is known that once every L symbols, the symbol frequency is fixed at a known value, that is, $\mu_{kL} = 1$, and $\omega_{kL}$ is known, for k an integer. In that case, Step P1f is replaced by the following:
  Step P1f': If i=kL, for k an integer, then execute Procedure P4, else go to Step P1g
  Procedure P5 serves to reset the recursion so as to avoid an unlimited propagation of errors in the accumulated values.

In its present embodiment, the invention is implemented in a FORTRAN computer software subroutine. Primary inputs to the subroutine consist of the following:
(1) A filtered input signal
(2) Filter coefficients
(3) A description of the modulation structure of the SOI
(4) An SOI symbol synchronization signal
(5) An SOI frame synchronization signal
(6) The SOI amplitude
(7) The noise power The primary output of the subroutine is the estimated symbol frequency sequence.

Figure 2:
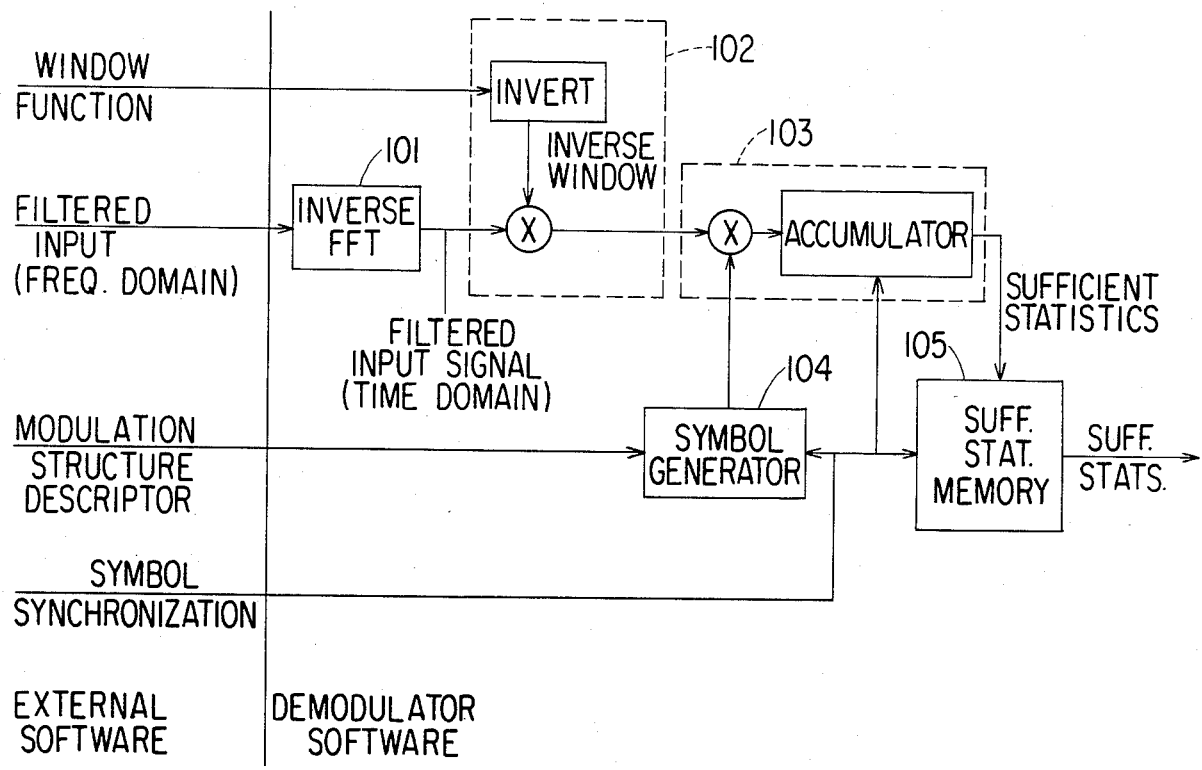
FIG. 2 is a block diagram showing the sufficient statistic computation.

The demodulator first computes a set of sufficient statistics from the filtered input signal (see FIG. 2). This signal, which is input as a set of spectral samples, is first inverse fast Fourier transformed (101), and then an inverse window is applied (102) if appropriate. A table of sufficient statistics is then computed by correlating (103) the time-domain signal samples with locally generated (104) symbol replicas. The sufficient statistics are stored in memory (105).

Figure 3:
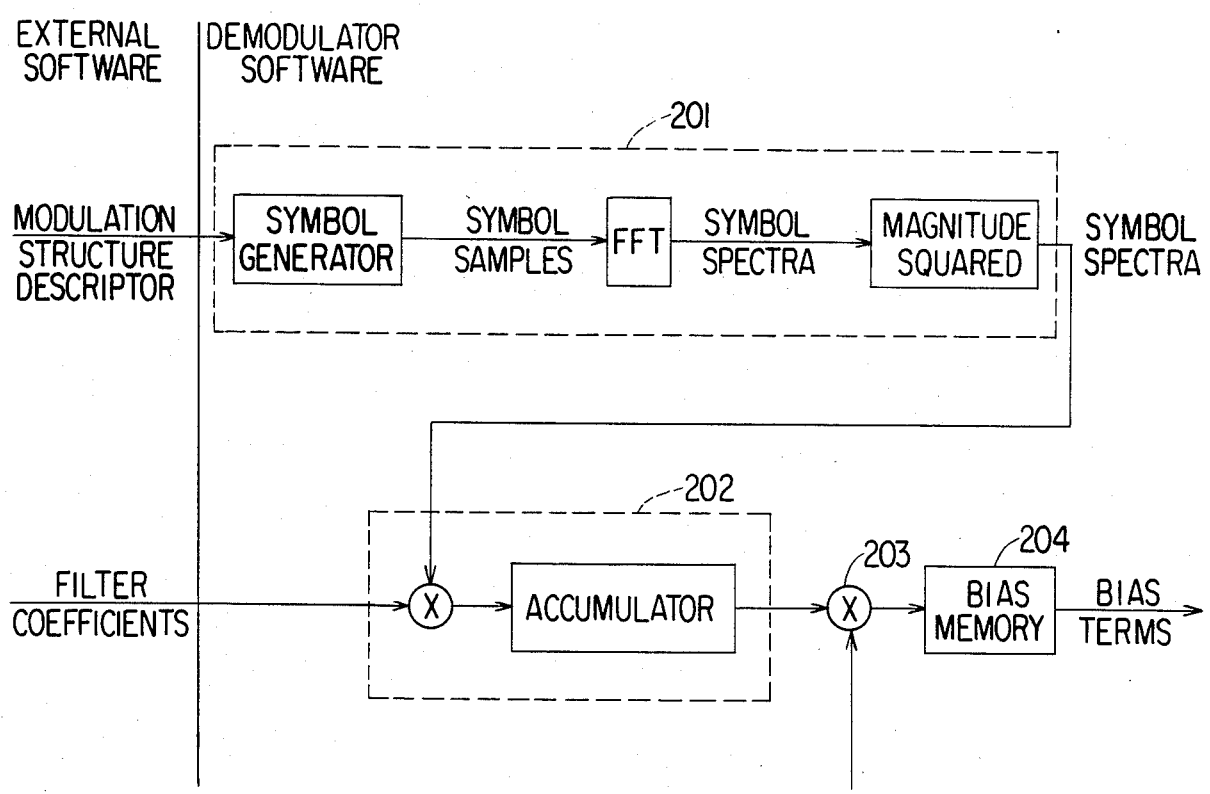
FIG. 3 is a block diagram showing the bias terms computation.

The second process carried out by the demodulator is that of bias term computation (see FIG. 3). From the description of the SOI modulation structure, the power spectrum of each possible symbol is computed (201) and correlated (202) with the filter coefficients. These correlation results are multiplied by $-\frac{1}{2}$ (203) and stored in memory (204). Bias terms are updated only once each block, where a block consists of a number (typically 4096) of processed signal samples.

Figure 4:
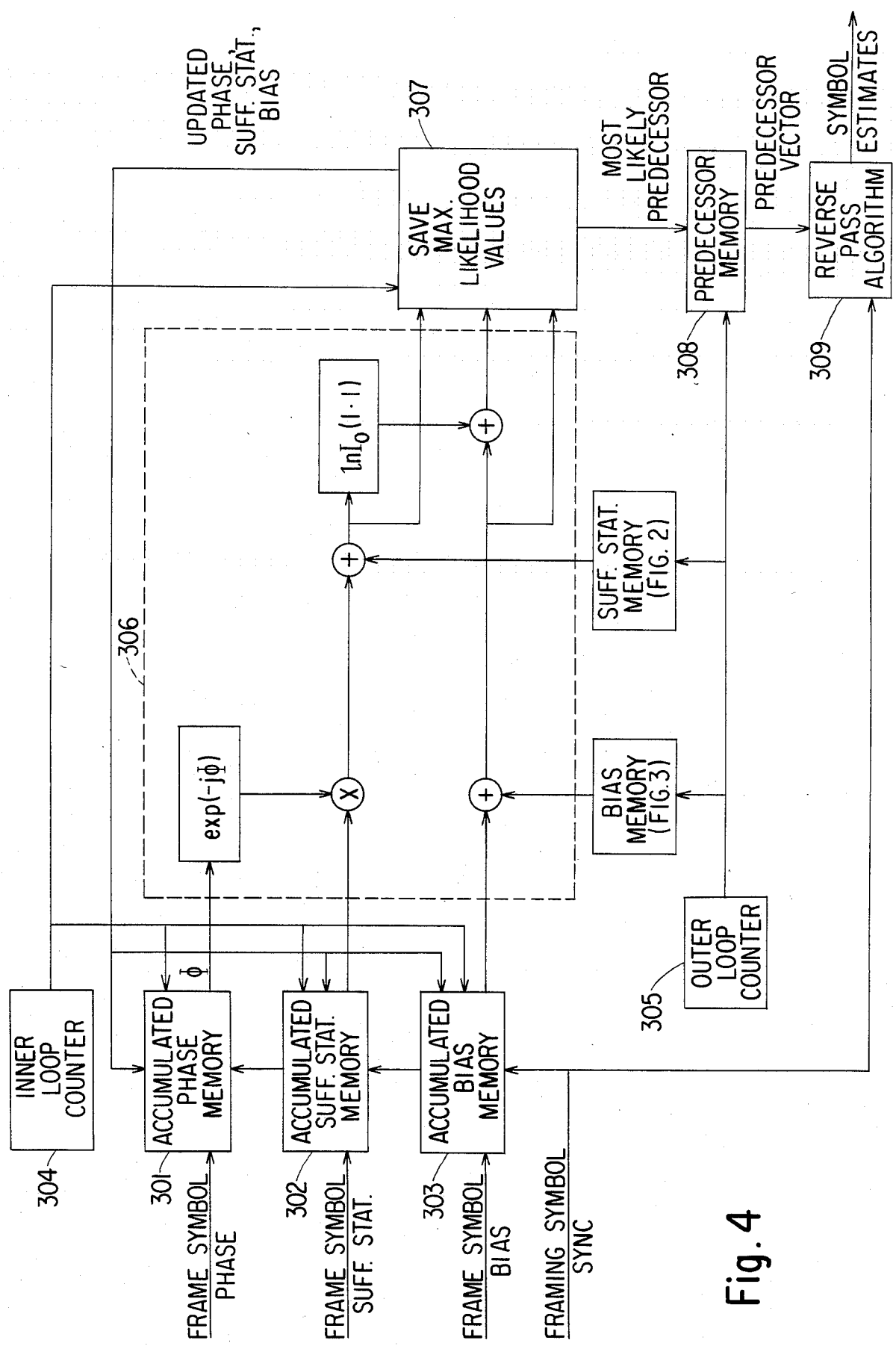
FIG. 4 is a block diagram showing the demodulation process.
Figure 5:
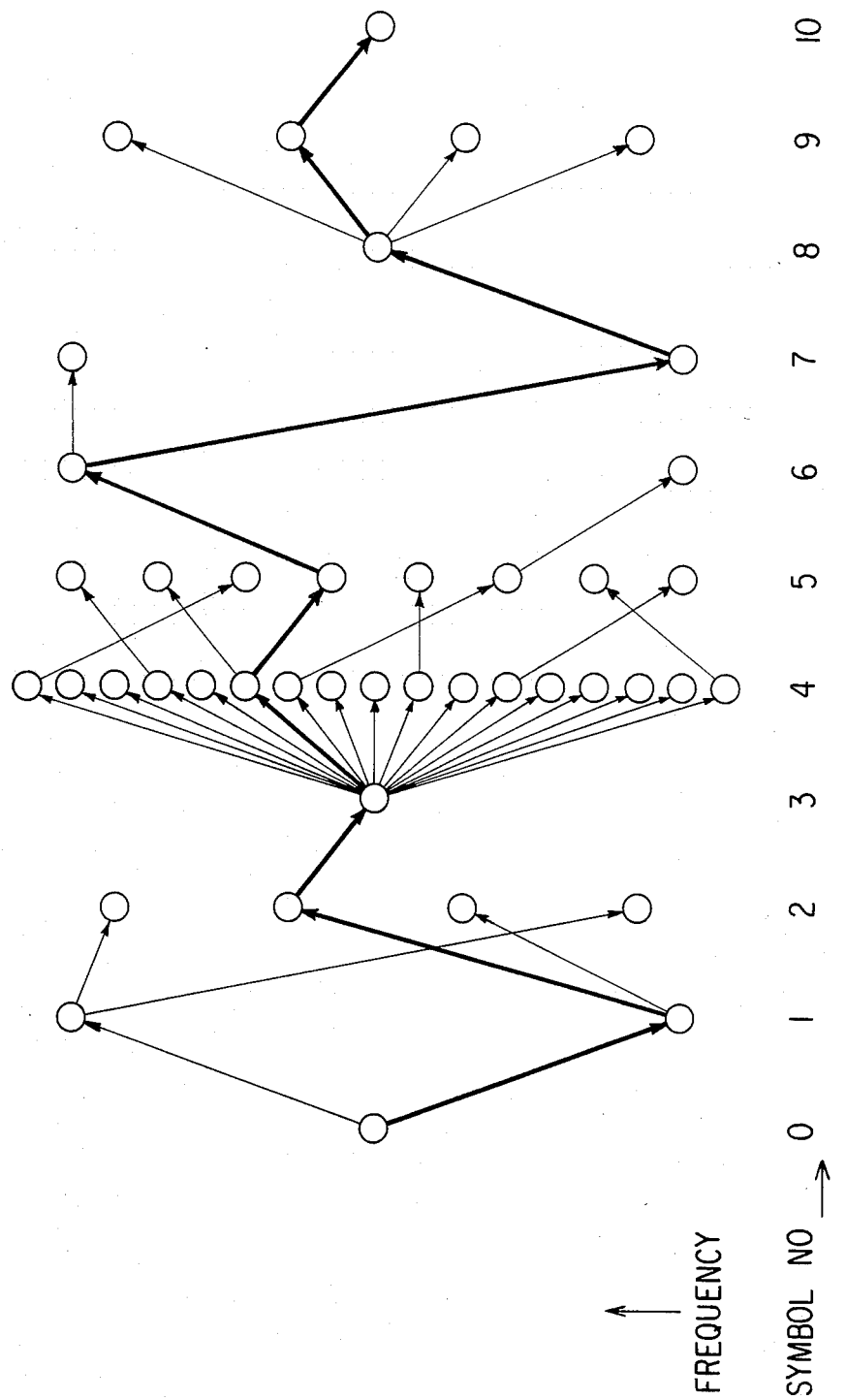
FIG. 5 illustrates the two pass demodulation process according to this invention for an illustrative signal frame.

Computed values of bias terms and sufficient statistics serve as input to the demodulation loop (FIG. 4). In the current embodiment, the demodulator assumes a fixed-frequency framing symbol spanning symbol periods 39 and 40, 79 and 80, 119 and 120, itc., and data symbols elsewhere. Thus, a sequence of candidate symbol predecessors is accumulated over 38 data symbols, and then, at the framing symbol, which is at a fixed, known frequency, a singular predecessor naturally occurs, and a set of symbol estimates is selected back to the previous framing symbol. FIG. 5 depicts the process for a single frame consisting of 9 data symbols and 1 framing symbol. The modulation structure depicted is as follows:

| Symbol No. | Modulation |
| --- | --- |
| 0 (frame symbol) | invariant |
| 1 | binary |
| 2 | quaternary |
| 3 | invariant |
| 4 | analog |
| 5 | octal |
| 6 | binary |
| 7 | binary |
| 8 | invariant |
| 9 | quaternary |
| 10 (frame symbol) | invariant |

Note that the analog symbol (No. 4) is depicted as being quantized to 17 levels. The light arrows in FIG. 5 illustrate the set of candidate predecessors chosen on the forward pass; the heavy line shows the estimated sequence chosen on the reverse pass after Symbol 10 is encountered.

At each symbol time (the "current" symbol), a most likely predecessor value is chosen for each possible value of the current symbol frequency. Thus, at each symbol, two loops are invoked; the outer loop corresponds to each possible frequency of the current symbol, while the inner loop corresponds to each possible frequency of the preceding symbol.

As shown in FIG. 4, memory locations are reserved for the phase (301), sufficient statistic sum (302), and bias sum (303) accumulated up through the predecessor symbol. The proper values are selected by way of the inner loop counter (304). Sufficient statistics and bias terms are selected for the current symbol by the outer loop counter (305). Likelihood functions are computed in 306 and, if a likelihood function is larger than the previous maximum (or upon the first iteration of the inner loop) the values of the likelihood function and current sufficient statistic and bias sums are saved (307). Upon exit from the inner loop, the phase, sufficient statistic, and bias sums are updated (301, 302, 303) to correspond to the maximum likelihood. The predecessor value corresponding to the maximum likelihood is also saved (308). This process continues until the framing symbol is encountered, at which time the reverse pass algorithm (309) is invoked, the resulting symbol value estimates are output, and the sufficient statistic, bias, and phase sums are reset to those of the framing symbol.

The reverse pass algorithm selects the single predecessor of the most recent framing symbol, then selects the predecessor of the predecessor, etc., back to the previous framing symbol. The sequence of predecessors forms the output symbol value sequence.

Accordingly, there has been disclosed a recursive frequency shift keyed demodulation system. It is understood that the above-described embodiment is merely illustrative of the application of the principles of this invention. Numerous other embodiments may be devised by those skilled in the art without departing from the spirit and scope of this invention, as defined by the appended claims.

What is claimed is:

1. A method for demodulating a sequence of continuous phase frequency shift keyed signals into a sequence of symbols, comprising the steps of:
    (a) choosing the most likely predecessor symbol for each of the available symbols at each symbol time from the frequency shift keyed signals;
    (b) storing all such chosen predecessor symbols;
    (c) determining whether there is a singular predecessor symbol;
    (d) When a singular predecessor symbol is encountered, choosing from the stored predecessor symbols a unique sequence of predecessor symbols from that singular predecessor symbol back to the next most recent previously encountered singular predecessor symbol; and
    (e) outputting the unique sequence of symbols.

2. The method according to claim 1 wherein the step (a) includes calculating the likelihood function for the transition to each available symbol from each predecessor symbol.

* * * * *